US012339121B2

(12) United States Patent
Hirayama et al.

(10) Patent No.: US 12,339,121 B2
(45) Date of Patent: Jun. 24, 2025

(54) HEAVY GOODS VEHICLE

(71) Applicant: JFE STEEL CORPORATION, Tokyo (JP)

(72) Inventors: Hideki Hirayama, Sapporo (JP); Yusuke Kaneta, Sapporo (JP); Shigeki Kumagai, Kawanishi (JP); Shinji Nanba, Tokyo (JP); Toshiyuki Kohara, Tokyo (JP); Shuei Tanaka, Tokyo (JP); Haruhisa Sakai, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 383 days.

(21) Appl. No.: 17/996,665

(22) PCT Filed: Apr. 21, 2021

(86) PCT No.: PCT/JP2021/016217
§ 371 (c)(1),
(2) Date: Oct. 20, 2022

(87) PCT Pub. No.: WO2021/215481
PCT Pub. Date: Oct. 28, 2021

(65) Prior Publication Data
US 2023/0221121 A1 Jul. 13, 2023

(30) Foreign Application Priority Data
Apr. 22, 2020 (JP) .................. 2020-075843

(51) Int. Cl.
*G01C 21/16* (2006.01)
*B60P 3/00* (2006.01)
(Continued)

(52) U.S. Cl.
CPC ......... *G01C 21/188* (2020.08); *G01C 21/165* (2013.01); *G01C 21/166* (2020.08);
(Continued)

(58) Field of Classification Search
CPC .... G01C 21/188; G01C 22/00; G01C 21/166; G01C 21/28; G01S 19/45; B60P 3/00; G01G 19/08
(Continued)

(56) References Cited

U.S. PATENT DOCUMENTS 7,782,183 B2 * 8/2010 Wieser ............... B60C 23/0433
340/447
2002/0091472 A1 7/2002 Jager et al.
(Continued)

FOREIGN PATENT DOCUMENTS

CN 101072694 A 11/2007
CN 106029477 B * 6/2020 ............ B60W 30/09
(Continued)

OTHER PUBLICATIONS

Yoon, Jae-woo, and Byeong-woo Kim. "Vehicle Position Estimation Using Nonlinear Tire Model for Autonomous Vehicle." Journal of mechanical science and technology 30.8 (2016): 3461-3468. Web. (Year: 2016).*

(Continued)

*Primary Examiner* — Peter D Nolan
*Assistant Examiner* — Keith A von Volkenburg
(74) *Attorney, Agent, or Firm* — KENJA IP LAW PC

(57) ABSTRACT

A heavy goods vehicle includes a displacement calculator that calculates a displacement by multiplying an arc length per unit rotation angle of the outer circumference of a specified tire by the first physical quantity, a vehicle position estimator that estimates a vehicle position using the displacement, and a memory that stores a correlation between a second physical quantity corresponding to a loading weight and an arc length per predetermined rotation angle at the outer circumference of the specified tire. The displacement calculator refers to the correlation to calculate a current (Continued)

arc length per unit rotation angle at the outer circumference of the specified tire from the second physical quantity corresponding to the loading weight, and calculates the displacement by multiplying the first physical quantity detected by the rotation amount detector by the current arc length per unit rotation angle.

8 Claims, 5 Drawing Sheets

(51) Int. Cl.
    *B60W 40/10* (2012.01)
    *G01C 21/28* (2006.01)
    *G01C 22/00* (2006.01)
    *G01G 19/08* (2006.01)
    *G01S 19/45* (2010.01)

(52) U.S. Cl.
    CPC ............ *G01C 21/28* (2013.01); *G01C 22/00* (2013.01); *G01S 19/45* (2013.01); *B60P 3/00* (2013.01); *B60W 40/10* (2013.01); *B60W 2300/12* (2013.01); *G01G 19/08* (2013.01)

(58) Field of Classification Search
    USPC .......................................................... 701/472
    See application file for complete search history.

(56) References Cited

U.S. PATENT DOCUMENTS

| | | | | |
|---|---|---|---|---|
| 2002/0198632 A1* | 12/2002 | Breed | ............... | G01S 17/86 701/472 |
| 2008/0040023 A1* | 2/2008 | Breed | ............... | G05D 1/0278 701/472 |
| 2008/0154495 A1* | 6/2008 | Breed | ............... | G01C 21/20 701/472 |
| 2008/0215202 A1* | 9/2008 | Breed | ............... | G01C 21/3694 701/472 |
| 2009/0033540 A1* | 2/2009 | Breed | ............... | G05D 1/0278 701/472 |
| 2009/0043506 A1* | 2/2009 | Breed | ............... | G08G 1/161 701/472 |
| 2009/0224899 A1 | 9/2009 | Wieser | | |
| 2017/0307385 A1* | 10/2017 | Izumi | ............... | G01C 21/28 |
| 2017/0347624 A1 | 12/2017 | Jorgensen et al. | | |
| 2018/0188031 A1* | 7/2018 | Samper | ............... | G05D 1/0272 |
| 2019/0033466 A1* | 1/2019 | Palella | ............... | G01S 19/40 |
| 2019/0152276 A1* | 5/2019 | Fu | ............... | B60C 23/0474 |
| 2019/0351726 A1 | 11/2019 | Okimura et al. | | |
| 2020/0217405 A1* | 7/2020 | Dumas | ............... | F16H 48/22 |

FOREIGN PATENT DOCUMENTS

| | | | | |
|---|---|---|---|---|
| EP | 1824690 | B1 | | 8/2015 |
| JP | H0735562 | A | | 2/1995 |
| JP | 2000121357 | A | | 4/2000 |
| JP | 2003276413 | A | * | 9/2003 |
| JP | 2005187117 | A | * | 7/2005 |
| JP | 2008523360 | A | | 7/2008 |
| JP | 2019075642 | A | | 5/2019 |
| WO | WO-2016013372 | A1 | * | 1/2016 ............... B60P 1/04 |

OTHER PUBLICATIONS

Yoon, B. J et al. "Development of a Navigation Algorithm with Dead Reckoning for Unmanned Ground Vehicles." International journal of automotive technology 12.1 (2011): 111-118. Web. (Year: 2011).*

Chehri, Abdellah, and Paul Fortier. "Autonomous Vehicles in Underground Mines, Where we are, Where we are Going?" 2020 IEEE 91st Vehicular Technology Conference (VTC2020-Spring). Piscataway: IEEE, 2020. 1-5. Web. (Year: 2020).*

Aug. 27, 2024, Communication pursuant to Article 94(3) EPC issued by the European Patent Office in the corresponding European Patent Application No. 21791760.8.

Henri Liikanen et al., M-Estimator Application in Real-Time Sensor Fusion for Smooth Position Feedback of Heavy- Duty Field Robots, IEEE Conference on Cybernetics and Intelligent Systems (CIS) and Robotics, Automation and Mechatronics (RAM), 2019, pp. 368-373.

Apr. 8, 2022, Notification of Reasons for Refusal issued by the Japan Patent Office in the corresponding Japanese Patent Application No. 2020-075843 with English language Concise Statement of Relevance.

Jul. 13, 2021, International Search Report issued in the International Patent Application No. PCT/JP2021/016217.

Sep. 21, 2023, the Extended European Search Report issued by the European Patent Office in the corresponding European Patent Application No. 21791760.8.

Feb. 17, 2025, Office Action issued by the Korean Intellectual Property Office in the corresponding Korean Patent Application No. 10-2022-7036466 with English language concise statement of relevance.

Feb. 26, 2025, Office Action issued by the China National Intellectual Property Administration in the corresponding Chinese Patent Application No. 202180030066.3 with English language concise statement of relevance.

* cited by examiner

HEAVY GOODS VEHICLE

TECHNICAL FIELD

The present disclosure relates to heavy goods vehicles that include a cargo bed and a plurality of tires supporting the cargo bed, and which travel using the plurality of tires while a heavy object is loaded on the cargo bed.

BACKGROUND

A known example of a heavy goods vehicle is a carrier pallet truck for loading and transporting heavy objects (such as steel material or coils) on factory premises. For example, see Patent Literature (PTL) 1. Carrier pallet trucks travel while pallets carrying many heavy objects are loaded on the cargo bed.

CITATION LIST

Patent Literature

PTL 1: JP 2019-75642 A

SUMMARY

Technical Problem

In recent years, research has been conducted on automatic driving technology for automobiles and the like. If automatic driving could be achieved for heavy goods vehicles as well, work efficiency would improve. In order to achieve automatic driving, the vehicle position needs to be recognized with high accuracy. One method for recognizing the vehicle position is to specify the vehicle position based on the displacement obtainable by multiplying the number of tire revolutions by the tire's outside diameter. However, in a heavy goods vehicle, the load applied to the tires differs greatly between when the vehicle is unloaded and when it is loaded, resulting in a large fluctuation in the tire outer diameter. Fluctuation in the tire outer diameter decreases the recognition accuracy of the vehicle position. In addition, the use of an exclusive sensor to detect the outside diameter of the tire is undesirable, since the addition of the exclusive sensor and its wiring would increase costs for parts and manufacturing.

The present disclosure aims to improve the accuracy of vehicle position recognition using the number of tire revolutions and the outside diameter in a heavy goods vehicle while controlling an increase in costs.

Solution to Problem

A heavy goods vehicle according to an aspect of the present disclosure includes a cargo bed and a plurality of tires supporting the cargo bed, the heavy goods vehicle traveling by using the plurality of tires while a heavy object is loaded on the cargo bed, the heavy goods vehicle further including at least one rotation angle detector configured to detect a first physical quantity corresponding to a rotation angle of at least one specified tire in the plurality of tires; a displacement calculator configured to calculate a displacement by multiplying the first physical quantity detected by the rotation angle detector by an arc length per unit rotation angle corresponding to one unit of the first physical quantity at an outer circumference of the specified tire; a vehicle position estimator configured to estimate a vehicle position using the displacement calculated by the displacement calculator; a load detector configured to detect a second physical quantity corresponding to a loading weight of a heavy object loaded on the cargo bed; and a memory configured to store a correlation between the second physical quantity detected by the load detector and an arc length per predetermined rotation angle at the outer circumference of the specified tire, wherein the displacement calculator is configured to refer to the correlation in the memory and calculate a current arc length per unit rotation angle at the outer circumference of the specified tire from the second physical quantity detected by the load detector, and calculate the displacement by multiplying the first physical quantity detected by the rotation amount detector by the current arc length per unit rotation angle.

According to the above configuration, even if the tire outer diameter changes due to a change in the loading weight of a heavy goods vehicle with highly deflected tires from a large loading weight, the displacement of the heavy goods vehicle can be calculated from the tire rotation angle, taking into account the change in tire outer diameter. This enables highly accurate recognition of the vehicle position. Moreover, since a heavy goods vehicle is usually equipped with a load detector, there is no need to install a special sensor and its wiring to measure the tire outer diameter, thereby also preventing an increase in costs for parts and manufacturing.

Advantageous Effect

According to the present disclosure, the accuracy of vehicle position recognition using the number of tire revolutions and the outside diameter in a heavy goods vehicle can be improved while controlling an increase in costs.

DETAILED DESCRIPTION

Embodiments are described below with reference to the drawings.

Figure 1:
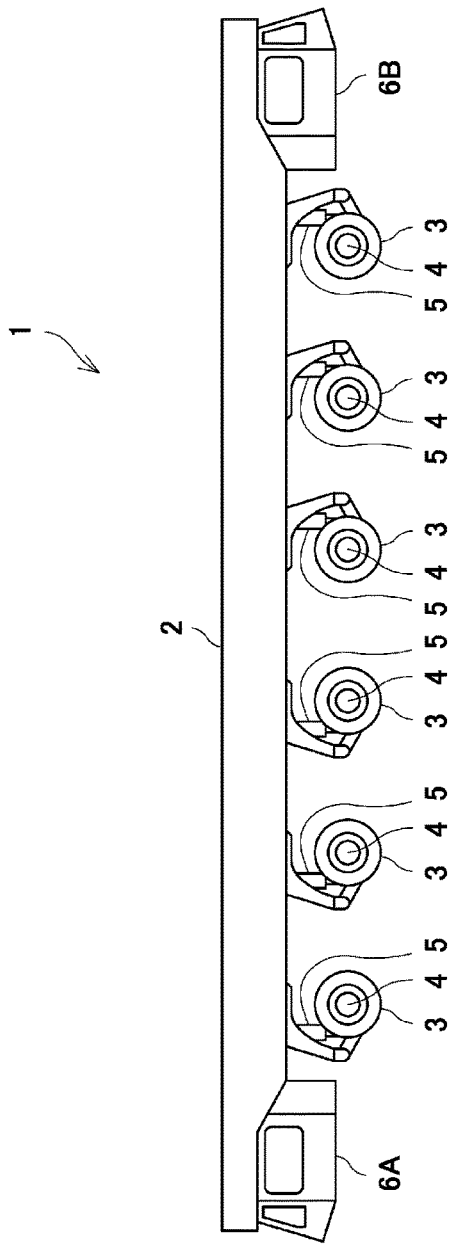
FIG. 1 is a side view of a heavy goods vehicle.

FIG. 1 is a side view of a heavy goods vehicle 1. As illustrated in FIG. 1, the heavy goods vehicle 1 exemplified in the present embodiment is a so-called carrier pallet vehicle. The heavy goods vehicle 1 includes a cargo bed 2 and a plurality (for example, 24) of tires 3 that support the cargo bed 2. A non-illustrated carrier pallet (heavy object) loaded with cargo (such as steel material or coils) is loaded onto the cargo bed 2. Among the plurality of tires 3, pairs of tires 3 are each coupled by an axle 4. A hydraulic lifting cylinder 5 is interposed between the cargo bed 2 and the tires 3 (specifically, the axle 4). The cargo bed 2 is raised and lowered by the expansion and contraction of the lifting cylinders 5.

The tires 3 (axles 4) support the load of the cargo bed 2 via the lifting cylinders 5. Driver's cabs 6A, 6B are respectively provided at the ends of the cargo bed 2 in the front-back direction. That is, when traveling in one direction, the driver boards the driver's cab 6A for operation, and when traveling in the other direction, the driver boards the driver's cab 6B for operation. Although a carrier pallet truck is illustrated as an example of the heavy goods vehicle 1, a vehicle other than a carrier pallet truck (for example, a dump truck) may also be used.

Figure 2:
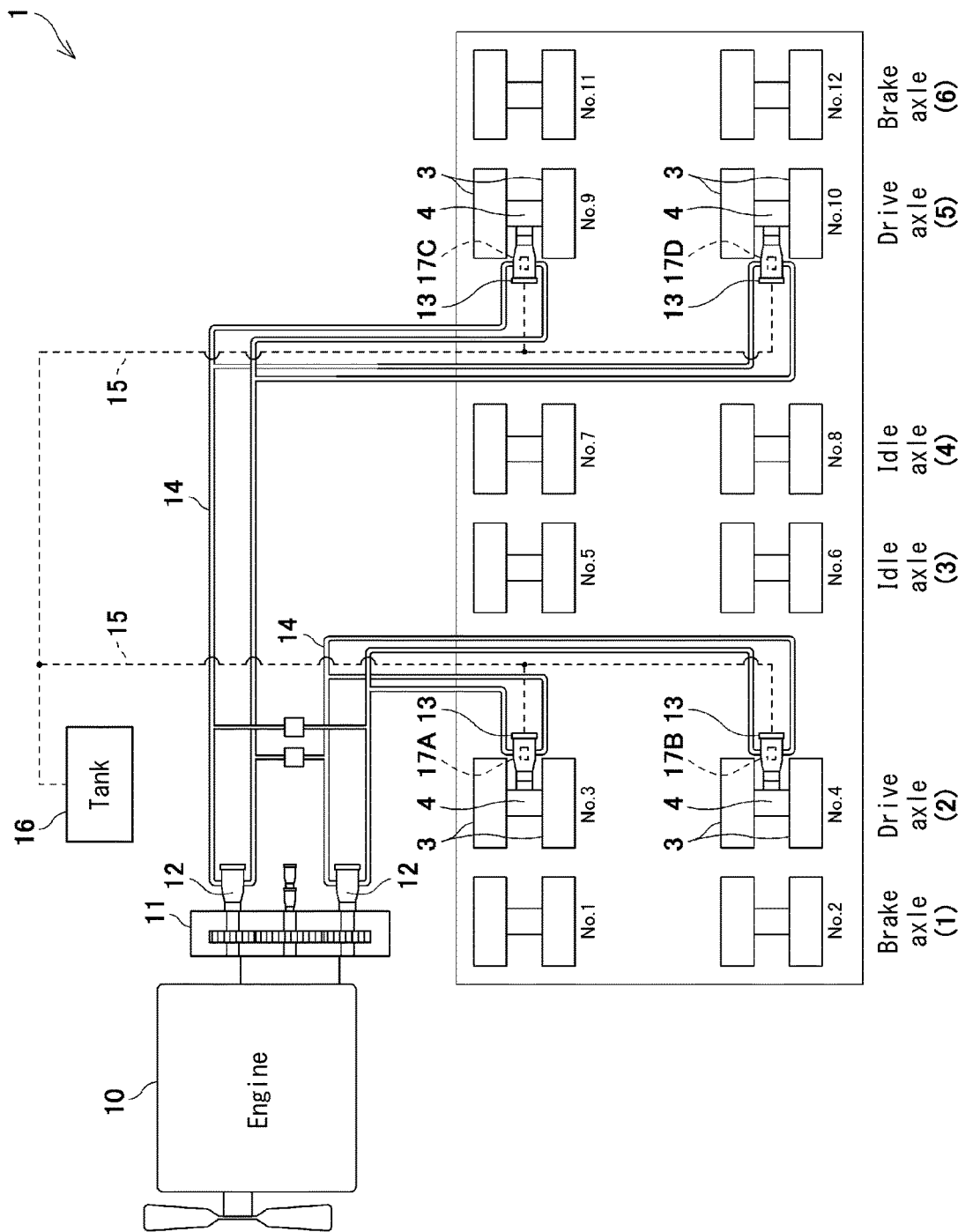
FIG. 2 is a schematic diagram of a running power system of the heavy goods vehicle in FIG. 1.

FIG. 2 is a schematic diagram of a running power system of the heavy goods vehicle 1 in FIG. 1. As illustrated in FIG. 2, the heavy goods vehicle 1 has six rows of axles 4 side by side. The axles 4 in the second and fifth rows are drive axles to which drive power is transmitted. The axles 4 (drive axles) in the second and fifth rows are connected to respective hydraulic motors 13. The other axles 4 are non-drive axles (driven axles) to which drive power is not transmitted. Specifically, the axles 4 in the first row and the sixth row are brake axles to which a braking force can be applied, and the axles 4 in the third and fourth rows are idle axles to which neither a driving force nor a braking force is applied.

The heavy goods vehicle 1 includes an engine 10 as the motor that generates the driving force. The engine 10 drives a pair of hydraulic pumps 12 via a gearbox 11. The hydraulic pumps 12 are connected to the hydraulic motors 13 via hydraulic pipes 14. That is, the hydraulic pressure generated by the hydraulic pumps 12 is transmitted to the hydraulic motors 13 via the hydraulic pipes 14 for the hydraulic motors 13 to drive the axles 4 (drive axles). Drain ports of the hydraulic motors 13 are connected to a hydraulic oil tank 16 via drain pipes 15.

First to fourth rotation angle sensors 17A to 17D are respectively installed inside the four hydraulic motors 13. The first to fourth rotation angle sensors 17A to 17D detect the number of revolutions of the axle 4 and tire 3 (specified tire) driven by the hydraulic motor 13 by detecting the number of revolutions of the hydraulic motor 13 in which the corresponding rotation angle sensor is installed. Specifically, the first to fourth rotation angle sensors 17A to 17D output a pulse signal at each predetermined rotation angle when the hydraulic motor 13 rotates. In other words, the number of pulse signals outputted by the first to fourth rotation angle sensors 17A to 17D determines the actual number of rotations (first physical quantity) of the tire 3 (specified tire) corresponding to the first to fourth rotation angle sensors 17A to 17D.

Although a rotation angle sensor installed inside the hydraulic motor has been illustrated as a rotation angle detector that detects a first physical quantity corresponding to the rotation angle of the tire, any other device that can determine the rotation angle of the tire may be used. For example, in the case of a dump truck, a rotation angle sensor that detects the rotation angle of the axle, the drive shaft coupled to the axle, or the output shaft that outputs drive power to the axle via the drive shaft can be used as a rotation angle detector that detects the first physical quantity corresponding to the rotation angle of the tire.

Figure 3:
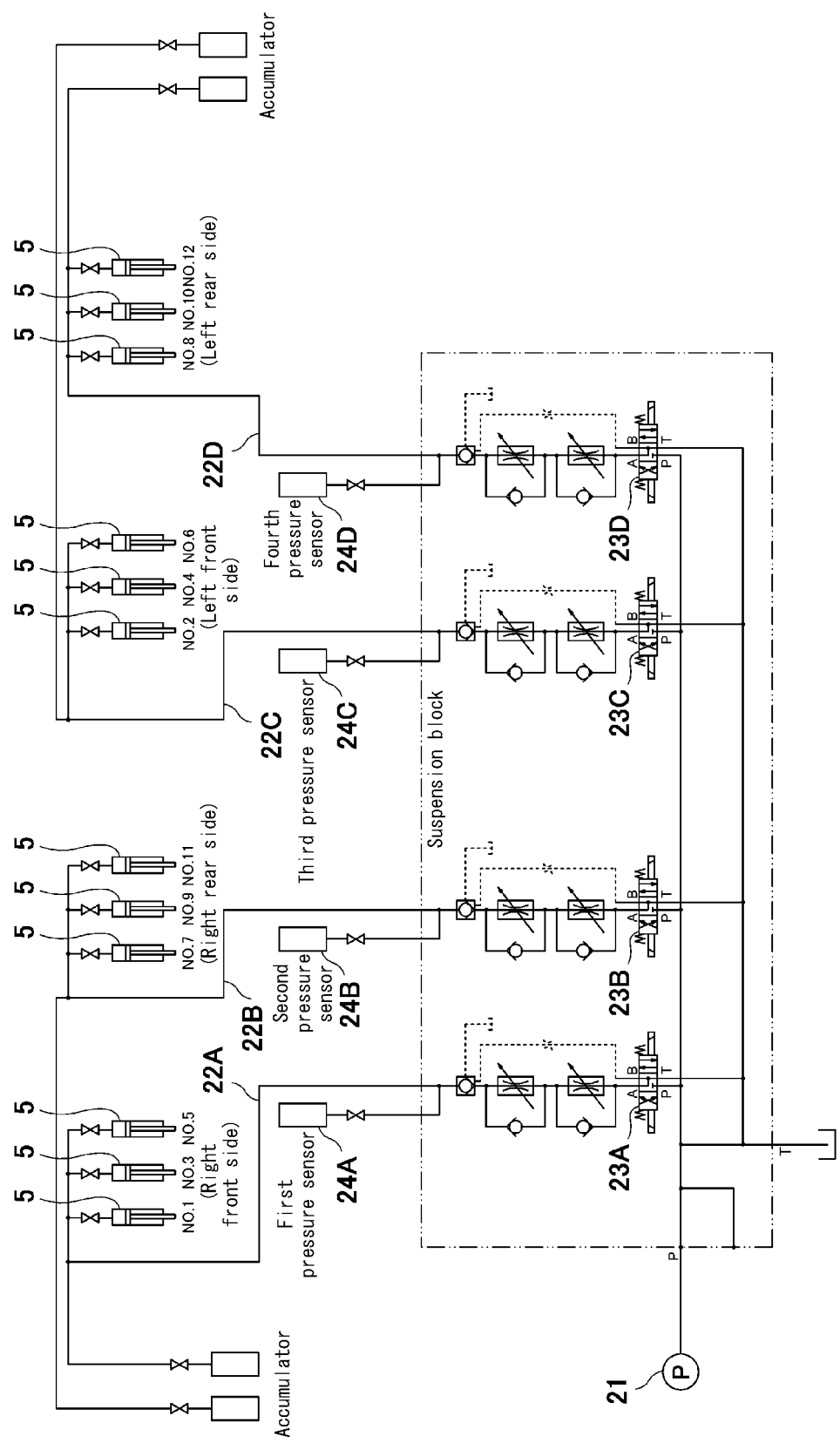
FIG. 3 is a schematic diagram of a cargo bed lifting system of the heavy goods vehicle in FIG. 1.

FIG. 3 is a schematic diagram of a cargo bed lifting system of the heavy goods vehicle 1 in FIG. 1. As illustrated in FIG. 3, a hydraulic pump 21 is connected via a first hydraulic pipe 22A to the lifting cylinders 5 (No. 1, No. 3, and No. 5) corresponding to the axles 4 on one side in the vehicle width direction in the first to third rows. The hydraulic pump 21 is connected via a second hydraulic pipe 22B to the lifting cylinders 5 (No. 7, No. 9, and No. 11) corresponding to the axles 4 on one side in the vehicle width direction in the fourth to sixth rows. The hydraulic pump 21 is connected via a third hydraulic pipe 22C to the lifting cylinders 5 (No. 2, No. 4, and No. 6) corresponding to the axles 4 on the other side in the vehicle width direction in the first to third rows. The hydraulic pump 21 is connected via a fourth hydraulic pipe 22D to the lifting cylinders 5 (No. 8, No. 10, and No. 12) corresponding to the axles 4 on the other side in the vehicle width direction in the fourth to sixth rows.

A first switching valve 23A is interposed in the first hydraulic pipe 22A, a second switching valve 23B is interposed in the second hydraulic pipe 22B, a third switching valve 23C is interposed in the third hydraulic pipe 22C, and a fourth switching valve 23D is interposed in the fourth hydraulic pipe 22D. The first to fourth switching valves 23A to 23D switch among a position to supply hydraulic pressure from the hydraulic pump 21 to the lifting cylinders 5 to extend the lifting cylinders 5, a position to drain the lifting cylinders 5 for the lifting cylinders 5 to retract, and a position to stop the lifting cylinders 5. In other words, by control of the first to fourth switching valves 23A to 23D, the lifting cylinders 5 extend and retract to raise and lower the cargo bed 2.

A first pressure sensor 24A is connected to the first hydraulic pipe 22A between the lifting cylinders 5 and the first switching valve 23A. A second pressure sensor 24B is connected to the second hydraulic pipe 22B between the lifting cylinders 5 and the second switching valve 23B. A third pressure sensor 24C is connected to the third hydraulic pipe 22C between the lifting cylinders 5 and the second switching valve 23C. A fourth pressure sensor 24D is connected to the fourth hydraulic pipe 22D between the lifting cylinders 5 and the second switching valve 23D.

The first pressure sensor 24A detects the pressure (second physical quantity) at which the No. 1, No. 3, and No. 5 lifting cylinders 5 support the cargo bed 2. The second pressure sensor 24B detects the pressure (second physical quantity) at which the No. 7, No. 9, and No. 11 lifting cylinders 5 support the cargo bed 2. The third pressure sensor 24C detects the pressure (second physical quantity) at which the No. 2, No. 4, and No. 6 lifting cylinders 5 support the cargo bed 2. The fourth pressure sensor 24D detects the pressure (second physical quantity) at which the No. 8, No. 10, and No. 12 lifting cylinders 5 support the cargo bed 2. That is, the pressure detected by the first through fourth pressure sensors 24A to 24D corresponds (proportionally) to the loading weight of the cargo bed 2.

Although a pressure sensor that detects the pressure of the lifting cylinders 5 that support the cargo bed 2 from below has been illustrated as a load detector that detects the second physical quantity corresponding to the loading weight of the heavy object loaded on the cargo bed 2, any other device (for example, a load cell interposed between the cargo bed and the apparatus supporting the cargo bed) capable of ascertaining the loading weight may be used.

Figure 4:
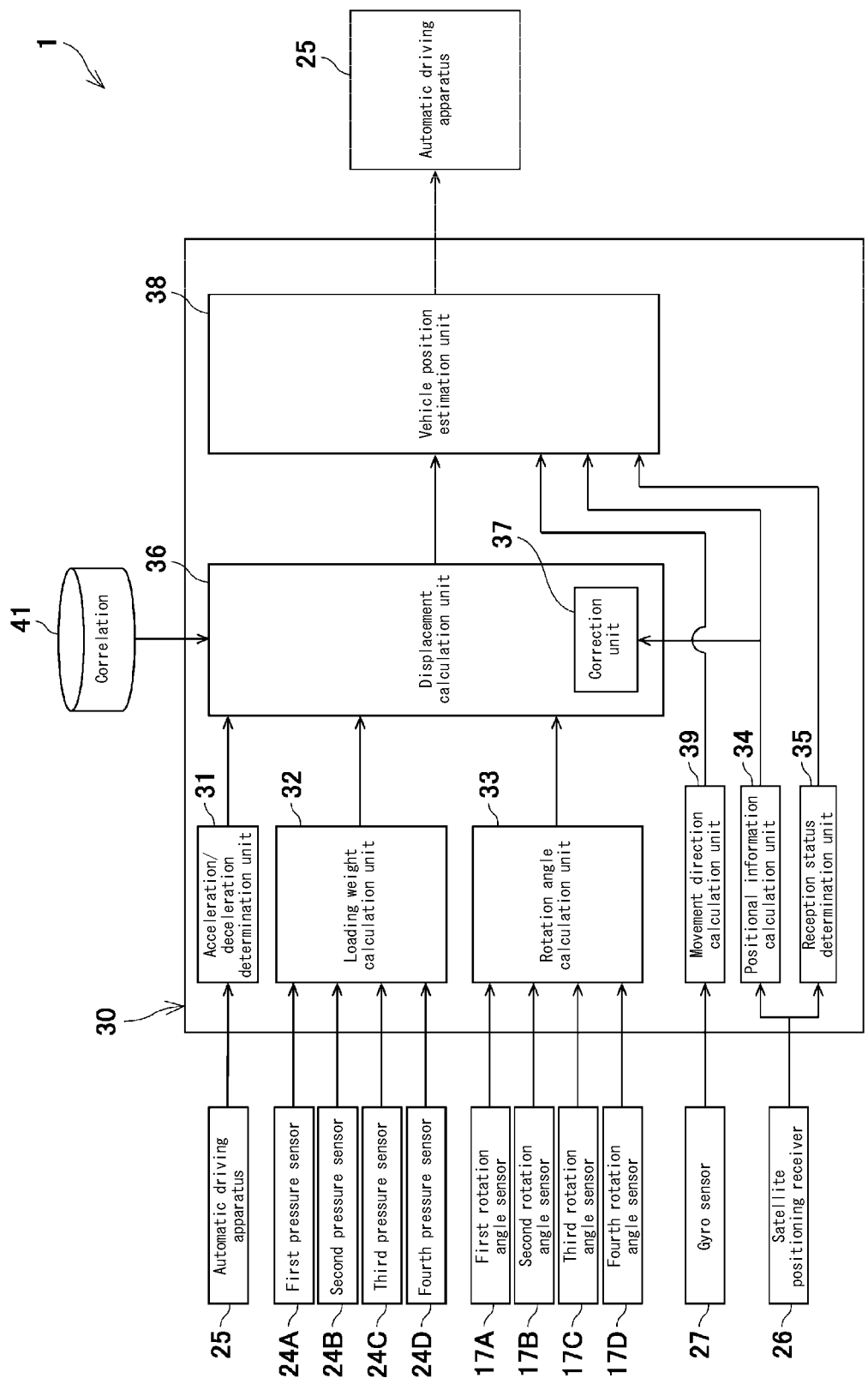
FIG. 4 is a block diagram of a vehicle position estimation system of the heavy goods vehicle in FIG. 1.

FIG. 4 is a block diagram of a vehicle position estimation system of the heavy goods vehicle 1 in FIG. 1. As illustrated in FIG. 4, the heavy goods vehicle 1 includes an arithmetic processor 30. An automatic driving apparatus 25, the first to fourth pressure sensors 24A to 24D, the first to fourth rotation angle sensors 17A to 17D, a gyro sensor 27, a satellite positioning receiver 26, and the like are connected on the input side of the arithmetic processor 30. The automatic driving apparatus 25 is connected on the output side of the arithmetic processor 30. In FIG. 4, the automatic driving apparatus 25 is depicted separately on the input side and the output side, but these are substantially the same apparatus.

The automatic driving apparatus 25 controls the engine 10, an apparatus (not illustrated) for switching the travel direction (forward or backward), a steering apparatus (not illustrated), a braking apparatus (not illustrated), and the like so that the heavy goods vehicle 1 drives automatically based on the vehicle position, the surrounding environment, a driving plan, and the like. The satellite positioning receiver 26 receives positional information from a satellite positioning system. An RTK-GNSS or Quasi-Zenith Satellite System receiver is preferably used in the satellite positioning receiver 26.

In terms of hardware, the arithmetic processor 30 includes a processor, a storage device, an I/O interface, and the like. In terms of software, the arithmetic processor 30 includes an acceleration/deceleration determination unit 31 (acceleration/deceleration determiner), a loading weight calculation unit 32, a rotation angle calculation unit 33, a movement direction calculation unit 39, a positional information calculation unit 34, a reception status determination unit 35, a displacement calculation unit 36 (displacement calculator), a correction unit 37 (corrector), a vehicle position estimation unit 38 (vehicle position estimator), and the like. Each of the components 31 to 48 is realized by a processor performing arithmetic processing based on a program stored in a storage device.

The acceleration/deceleration determination unit 31 determines whether the heavy goods vehicle 1 is in an acceleration state or a deceleration state based on commands from the automatic driving apparatus 25. The acceleration/deceleration determination unit 31 may make the determination based on other information as long as the acceleration/deceleration state of the heavy goods vehicle 1 is known.

The loading weight calculation unit 32 calculates the loading weight from the pressures detected by the first to fourth pressure sensors 24A to 24D based on a predetermined calculation formula representing the relationship between the sum of the pressures detected by the first to fourth pressure sensors 24A to 24D and the loading weight of the heavy object loaded on the cargo bed 2.

The rotation angle calculation unit 33 calculates the rotation angle of the tires 3 at each time based on the pulse signals detected by the first to fourth rotation angle sensors 17A to 17D. The rotation angle calculation unit 33 may calculate an average of the rotation angles calculated from the detected values of the first to fourth rotation angle sensors 17A to 17D as the rotation angle of the tires 3, or other calculation methods may be used. For example, when the acceleration/deceleration determination unit 31 determines that the heavy goods vehicle 1 is in an acceleration state, the rotation angle calculation unit 33 may calculate a value other than the maximum value among the rotation angles detected by the first to fourth rotation angle sensors 17A to 17D as the rotation angle of the tires 3. Alternatively, when the acceleration/deceleration determination unit 31 determines that the heavy goods vehicle 1 is in a deceleration state, the rotation angle calculation unit 33 may calculate a value other than the minimum value among the rotation angles detected by the first to fourth rotation angle sensors 17A to 17D as the rotation angle of the tires 3. Alternatively, the rotation angle calculation unit 33 may calculate a value other than the maximum value and the minimum value among the rotation angles detected by the first to fourth rotation angle sensors 17A to 17D as the rotation angle of the tires 3.

The movement direction calculation unit 39 calculates the movement direction of the heavy goods vehicle 1 at each time based on a detection signal from the gyro sensor 27. The positional information calculation unit 34 calculates the positional information of the heavy goods vehicle 1 based on information received by the satellite positioning receiver 26.

The reception status determination unit 35 determines whether the reception status of the satellite positioning receiver 26 is a predetermined good status or a predetermined poor status based on information received by the satellite positioning receiver 26.

The displacement calculation unit 36 calculates the displacement (travel distance) by multiplying the rotation angle calculated by the rotation angle calculation unit 33 by the arc length per unit of the rotation angle (unit rotation angle) at the outer circumference of a specified tire 3. The displacement calculation unit 36 refers to a correlation stored in a correlation storage device 41 (memory). The correlation stored in the correlation storage device 41 is the correlation between the arc length per unit rotation angle (one unit of rotation angle) at the outer circumference of the specified tire 3 and the loading weight calculated by the loading weight calculation unit 32.

The prescribed outer diameter of the tire 3 used for the heavy goods vehicle 1 is predetermined. However, as the loading weight increases, the load on the tire 3 increases, and the outer diameter of the tire 3 rolling on the road surface is substantially reduced. Therefore, the correlation stored in advance in the correlation storage device 41 is set so that as the loading weight W calculated by the loading weight calculation unit 32 increases, the arc length L per unit rotation angle at the outer circumference of the specified tire 3 decreases. The correlation stored by the correlation storage device 41 may be a table with a plurality of correspondences between the loading weight W (i) and the arc length L (i) or may be a formula for calculating the arc length L from the loading weight W.

The displacement calculation unit 36 refers to the correlation stored in the correlation storage device 41 and calculates the current arc length per unit rotation angle at the outer circumference of the tire 3 from the loading weight calculated by the loading weight calculation unit 32. The displacement calculation unit 36 then calculates the displacement by multiplying the rotation angle calculated by the rotation angle calculation unit 33 by the current arc length per unit rotation angle.

The vehicle position estimation unit 38 is configured to refer to the movement direction at each time as calculated by the movement direction calculation unit 39 and to identify (estimate) the vehicle position from the displacement at each time calculated by the displacement calculation unit 36. The vehicle position estimation unit 38 is also configured to refer to map information stored in a map information storage device 42 and to identify (estimate) the vehicle position from the positional information calculated by the positional information calculation unit 34. In the present embodiment, the vehicle position estimation unit 38 is configured to identify (estimate) the vehicle position based on the displacement calculated by the displacement calculation unit 36 and the positional information calculated by the positional information calculation unit 34.

Specifically, when the reception status of the satellite positioning receiver 26 is determined by the reception status determination unit 35 to be a predetermined poor status, the vehicle position estimation unit 38 identifies the vehicle position using the displacement calculated by the displacement calculation unit 36. When the reception status of the satellite positioning receiver 26 is determined by the reception status determination unit 35 to be a predetermined good status, the vehicle position estimation unit 38 identifies (interpolates) the vehicle position using the displacement calculated by the displacement calculation unit 36 in a blank interval between sampling intervals of the satellite positioning receiver 26 while identifying the vehicle position using the positional information calculated by the positional information calculation unit 34.

The correction unit 37 calculates the ratio of an amount of change $D_s$, over a predetermined time period T, in the vehicle position calculated by the positional information calculation unit 34 when the reception status is determined by the reception status determination unit 35 to be good to a displacement $D_p$ calculated by the displacement calculation unit 36 over the predetermined time period T as a correction coefficient α ($α=D_s/D_p$). The correction unit 37 then corrects the arc length L corresponding to the current loading weight W, which is stored in the correlation storage device 41, by multiplying by the correction coefficient α (L=L×α). In this way, the correction unit 37 corrects the calculation process by the displacement calculation unit 36 by using the correction coefficient α.

Instead of updating the correlation itself stored in the correlation storage device 41, the correction unit 37 may, each time the displacement calculation unit 36 reads the arc length L from the correlation storage device 41, multiply the read arc length L by the correction coefficient α.

Figure 5:
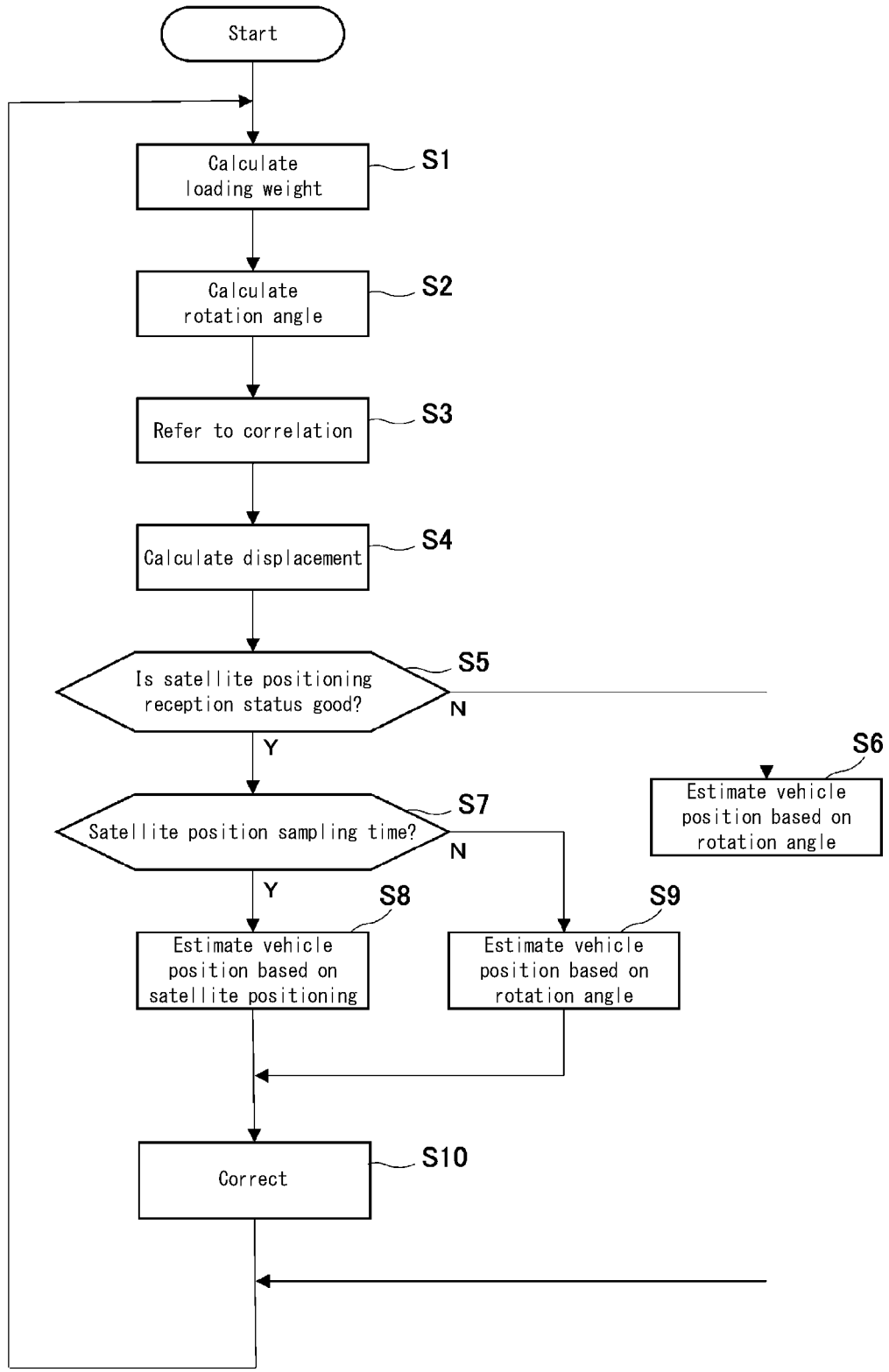
FIG. 5 is a flowchart of estimation processing by the vehicle position estimation system in FIG. 4.

FIG. 5 is a flowchart of estimation processing by the vehicle position estimation system in FIG. 4. The processing is described below following the flow in FIG. 5, referring to FIGS. 1 to 4 as appropriate. In the arithmetic processor 30, the loading weight calculation unit 32 calculates the loading weight from the detected values of the first to fourth pressure sensors 24A to 24D (step S1). The state rotation angle calculation unit 33 calculates the rotation angle of the tire 3 from at least one detected value among the first to fourth rotation angle sensors 17A to 17D (step S2).

The displacement calculation unit 36 refers to the correlation stored in the correlation storage device 41 (memory) and calculates the current arc length L per unit rotation angle at the outer circumference of the tire 3 from the loading weight calculated by the loading weight calculation unit 32 (step S3). The displacement calculation unit 36 calculates the displacement $D_p$ (step S4).

The reception status determination unit 35 determines whether the reception status of the satellite positioning receiver 26 is a predetermined good status based on information received by the satellite positioning receiver 26 (step S5). When the reception status determination unit 35 determines that the reception status of the satellite positioning receiver 26 is not a good status (step S5: N), the vehicle position is estimated using the displacement calculated by the displacement calculation unit 36 in step S4 (step S6).

On the other hand, when the reception status determination unit 35 determines that the reception status of the satellite positioning receiver 26 is a good status (step S5: Y), the vehicle position estimation unit 38 determines whether the current time falls under a sampling time for the satellite positioning receiver 26 (step S7). When it is determined that the current time falls under a sampling time of the satellite positioning receiver 26 (step S7: Y), the vehicle position is estimated using the positional information calculated by the positional information calculation unit 34 based on the received information from the satellite positioning receiver 26 (step S8).

On the other hand, when it is determined that the current time does not fall under the sampling time of the satellite positioning receiver 26 but is a blank period (step S7: N), the vehicle position is estimated (interpolated) using the displacement calculated by the displacement calculation unit 36 (step S9). When the reception status is determined to be good by the reception status determination unit 35, the correction unit 37 calculates the aforementioned correction coefficient α (step S10). In step S10, the calculation process by the displacement calculation unit 36 may be corrected by updating the correlation itself stored in the correlation storage device 41, or the calculation process by the displacement calculation unit 36 may be corrected by multiplying the arc length L per unit rotation angle read from the correlation storage device 41 by the correction coefficient α.

According to the configuration explained above, even if the outer diameter of the tire 3 changes due to a change in the loading weight of the heavy goods vehicle 1 with highly deflected tires 3 from a large loading weight, the displacement $D_p$ of the heavy goods vehicle 1 is calculated from the tire rotation angle of the tire 3, taking into account the change in outer diameter of the tire 3. This enables highly accurate recognition of the vehicle position. Moreover, since the heavy goods vehicle 1 is usually equipped with a load detector (first pressure sensor 24A and second pressure sensor 24B), there is no need to install a special sensor and its wiring to measure the outer diameter of the tire 3, thereby also preventing an increase in costs for parts and manufacturing.

The vehicle position estimation unit 38 also estimates the vehicle position using both the displacement $D_p$ calculated by the displacement calculation unit 36 and the positional information calculated by the positional information calculation unit 34 from the received information of the satellite positioning receiver 26, thus enabling highly accurate recognition of the vehicle position.

The vehicle position estimation unit 38 can also appropriately distinguish between estimation of the vehicle position using the displacement $D_p$ calculated by the displacement calculation unit 36 and estimation of the vehicle position using the positional information detected by the satellite positioning receiver 26, thus enabling highly accurate recognition of the vehicle position. Furthermore, the satellite positioning receiver 26 is an RTK-GNSS or Quasi-Zenith Satellite System receiver and can therefore accurately detect the vehicle position.

Since the calculation process by the displacement calculation unit 36 is corrected by the correction coefficient α, the calculation accuracy of the displacement $D_p$ by the displacement calculation unit 36 can be improved. Therefore, by the correction coefficient α being determined based on the ratio between the time change $D_s$ of the vehicle position received by the satellite positioning receiver 26 and the displacement $D_p$ calculated by the displacement calculation unit 36, the vehicle position can be estimated using the displacement calculation unit 36 based on an accurate tire outer diameter that reflects the current tire pressure.

When the acceleration/deceleration determination unit 31 determines that the heavy goods vehicle 1 is in a predetermined acceleration state, the displacement calculation unit 36 may calculate the displacement using a value other than the maximum value among the plurality of rotation angles detected by the first to fourth rotation angle sensors 17A to 17D. In this way, even if one of the specified tires 3 slips against the ground during vehicle acceleration, causing the rotation angle to increase, the increased rotation angle is not referenced for calculating the displacement, thus enabling highly accurate recognition of the vehicle position even when slipping occurs.

When the acceleration/deceleration determination unit 31 determines that the heavy goods vehicle 1 is in a predetermined deceleration state, the displacement calculation unit 36 may calculate the displacement using a value other than the minimum value among the plurality of rotation angles detected by the first to fourth rotation angle sensors 17A to 17D. In this way, even if one of the specified tires 3 locks against the ground during vehicle deceleration, causing the rotation angle to decrease, the decreased rotation angle is not referenced for calculating the displacement, thus enabling highly accurate recognition of the vehicle position even when locking occurs.

The displacement calculation unit 36 may also calculate the displacement using values other than the maximum value and minimum value among the plurality of rotation angles detected by the first through fourth rotation angle sensors 17A to 17D. This excludes the maximum value and minimum value, which have a high possibility of error, from calculation of the displacement, thus enabling highly accurate recognition of the vehicle position.

REFERENCE SIGNS LIST

1 Heavy goods vehicle
2 Cargo bed
3 Tire
17A First rotation angle sensor (rotation angle detector)
17B Second rotation angle sensor (rotation angle detector)
17C Third rotation angle sensor (rotation angle detector)
17D Fourth rotation angle sensor (rotation angle detector)
24A First pressure sensor (load detector)
24B Second pressure sensor (load detector)
26 Satellite positioning receiver
31 Acceleration/deceleration determination unit (acceleration/deceleration determiner)
36 Displacement calculation unit (displacement calculator)
37 Correction unit (corrector)
38 Vehicle position estimation unit (vehicle position estimator)
41 Correlation storage device (memory)

The invention claimed is:

1. A heavy goods vehicle comprising a cargo bed and a plurality of tires supporting the cargo bed, the heavy goods vehicle traveling by using the plurality of tires while a heavy object is loaded on the cargo bed, the heavy goods vehicle further comprising:
   at least one rotation angle detector configured to detect a first physical quantity corresponding to a rotation angle of at least one specified tire in the plurality of tires;
   a displacement calculator configured to calculate a displacement by multiplying the first physical quantity detected by the rotation angle detector by an arc length per unit rotation angle corresponding to one unit of the first physical quantity at an outer circumference of the specified tire;
   a vehicle position estimator configured to estimate a vehicle position using the displacement calculated by the displacement calculator;
   a load detector configured to detect a second physical quantity corresponding to a loading weight of a heavy object loaded on the cargo bed; and
   a memory configured to store a correlation between the second physical quantity detected by the load detector and an arc length per predetermined rotation angle at the outer circumference of the specified tire, wherein
   the displacement calculator is configured to
      refer to the correlation in the memory and calculate a current arc length per unit rotation angle at the outer circumference of the specified tire from the second physical quantity detected by the load detector, and
      calculate the displacement by multiplying the first physical quantity detected by the rotation angle detector by the current arc length per unit rotation angle, and
   the load detector is a pressure sensor configured to detect a pressure of a lifting cylinder supporting the cargo bed from below.

2. The heavy goods vehicle according to claim 1, further comprising:
   a satellite positioning receiver configured to receive positional information from a satellite positioning system, wherein
   the vehicle position estimator is configured to estimate the vehicle position based on the displacement calculated by the displacement calculator and information received by the satellite positioning receiver.

3. The heavy goods vehicle according to claim 2, further comprising a corrector configured to correct a calculation process by the displacement calculator based on a comparison between an amount of change in vehicle position received by the satellite positioning receiver over a predetermined time period and the displacement calculated by the displacement calculator over the predetermined time period.

4. The heavy goods vehicle according to claim 2, wherein the vehicle position estimator is configured to
   estimate the vehicle position using the displacement calculated by the displacement calculator when a reception status of the satellite positioning receiver is poorer than a predetermined status and
   estimate the vehicle position using the displacement calculated by the displacement calculator in a blank interval between sampling intervals of the satellite positioning receiver while estimating the vehicle position using information detected by the satellite positioning receiver when the reception status of the satellite positioning receiver is equal to or better than the predetermined status.

5. The heavy goods vehicle according to claim 2, wherein the satellite positioning receiver is an RTK-GNSS or Quasi-Zenith Satellite System receiver.

6. The heavy goods vehicle according to claim 1, further comprising:
   an acceleration/deceleration determiner configured to determine an acceleration/deceleration state of the heavy goods vehicle, wherein
   the at least one specified tire includes a plurality of specified tires,
   the at least one rotation angle detector includes a plurality of rotation angle detectors each configured to detect a first physical quantity corresponding to a rotation angle of a respective specified tire of the plurality of specified tires, and
   when it is determined by the acceleration/deceleration determiner that the heavy goods vehicle is in a predetermined acceleration state, the displacement detector is configured to calculate the displacement using a value other than a maximum value among a plurality of rotation angles respectively detected by the plurality of rotation angle detectors.

7. The heavy goods vehicle according to claim 1, further comprising:
   an acceleration/deceleration determiner configured to determine an acceleration/deceleration state of the heavy goods vehicle, wherein
   the at least one specified tire includes a plurality of specified tires, the at least one rotation angle detector includes a plurality of rotation angle detectors each configured to detect a first physical quantity corresponding to a rotation angle of a respective specified tire of the plurality of specified tires, and when it is determined by the acceleration/deceleration determiner that the heavy goods vehicle is in a predetermined deceleration state, the displacement detector is configured to calculate the displacement using a value other than a minimum value among a plurality of rotation angles respectively detected by the plurality of rotation angle detectors.

8. The heavy goods vehicle according to claim 1, wherein the at least one specified tire includes three or more specified tires, the at least one rotation angle detector includes three or more rotation angle detectors each configured to detect a first physical quantity corresponding to a rotation angle of a respective specified tire of the three or more specified tires, and the displacement detector is configured to calculate the displacement using a value other than a maximum value and a minimum value of three or more rotation angles respectively detected by the three or more rotation angle detectors.

* * * * *